United States Patent
Feldman

(10) Patent No.: US 7,715,109 B2
(45) Date of Patent: May 11, 2010

(54) DIGITAL IMAGE POINTING AND DIGITAL ZOOM OPTICAL SYSTEM

(75) Inventor: Martin Feldman, Baton Rouge, LA (US)

(73) Assignee: The Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 12/154,738

(22) Filed: May 27, 2008

(65) Prior Publication Data

US 2009/0015937 A1    Jan. 15, 2009

Related U.S. Application Data

(60) Provisional application No. 60/940,259, filed on May 25, 2007.

(51) Int. Cl.
  G02B 15/14 (2006.01)
  H04N 5/262 (2006.01)
(52) U.S. Cl. .................................... 359/676; 348/240.2
(58) Field of Classification Search ................. 359/618, 359/629, 639, 676; 348/240.2
See application file for complete search history.

(56) References Cited

U.S. PATENT DOCUMENTS 7,557,998 B2 *   7/2009  Reichert ..................... 359/662

* cited by examiner

*Primary Examiner*—William C Choi
(74) *Attorney, Agent, or Firm*—Jason P. Mueller; Raymond R. Ferrera; Adams and Reese LLP

(57) ABSTRACT

An optical system for the production of images, comprising an all optical system is disclosed. Said all optical system manipulates images directly by digital electronics without loss in the number of resolvable spots at higher magnifications.

1 Claim, 5 Drawing Sheets

DIGITAL IMAGE POINTING AND DIGITAL ZOOM OPTICAL SYSTEM

CROSS-REFERENCE TO RELATED APPLICATIONS

This Non-Provisional Patent Application, filed under 35 U.S.C. §111(a), claims the benefit under 35 U.S.C. §119(e)(1) of U.S. Provisional Patent Application No. 60/940,259 filed on May 25, 2007.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON COMPACT DISC

Not applicable.

BACKGROUND OF THE INVENTION

1. Field of the Invention

The present invention relates to image pointing and zoom and more particularly digital image processing.

2. Description of Related Art

For image pointing and zoom, the advantages of electronic digital image pointing and digital zoom are well established: compared to conventional gimbal mounts and zoom lenses, electronic image control is faster and, since there are no moving parts, more rugged and more reliable. Nevertheless, systems based on digital image processing do have speed limitations, and higher image magnification is achieved at the expense of loss of resolution.

BRIEF SUMMARY OF THE INVENTION

The object of the present invention is to develop an all optical system in which entire images are manipulated directly by digital electronics, and in which there is no loss in the number of resolvable spots at higher magnifications.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF THE INVENTION

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Figure 1A:
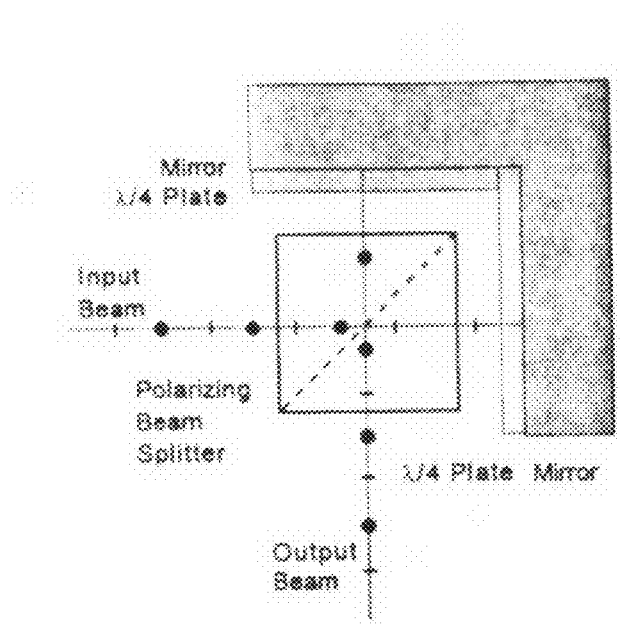
FIG. 1A illustrates two polarizations which follow different paths and are then recombined. For clarity some polarizations have been omitted.

The system is based on the principle that light passing through a polarizing beam splitter may take two different paths, depending on whether it is polarized horizontally or vertically (FIG. 1a). Thus, by controlling the polarization of light entering the beam splitter, the light may be directed to one of two different paths. Several devices may be used to control the polarization. The simplest, and for many applications the most practical, is the twisted nematic liquid crystal cell.[1][2]

[1] See J. Wilson and J. Hawkes, "Optoelectronics," 3rd edition, pp. 158-163, Prentice Hass 1998.
[2] See M. Feldman et al., "Optical Crossbar Switch," U.S. Pat. No. 6,792,175, Sep. 14, 2004.

Mirrors recombine the two paths by reflecting the exiting light back to the beam splitter. Quarter wave plates oriented with their fast axis at 45° are placed in both beam paths. Consequently, whichever path the light takes, when it returns to the beam splitter its direction of polarization is changed, and instead of returning to the source it exits from the 4th face of the beam splitter.

Figure 1B:
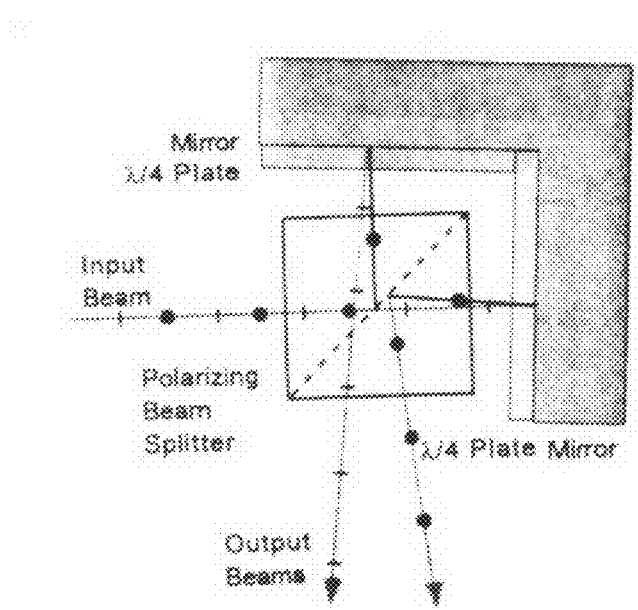
FIG. 1B illustrates the two polarizations follow paths at an angle to each other and represent two different polarizations.
Figure 2A:
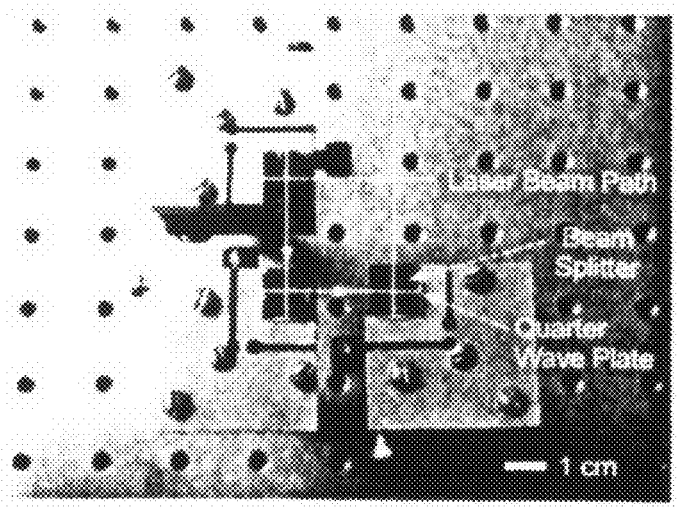
FIG. 2A illustrates apparatus that provides three stages of deflection.
Figure 2B:
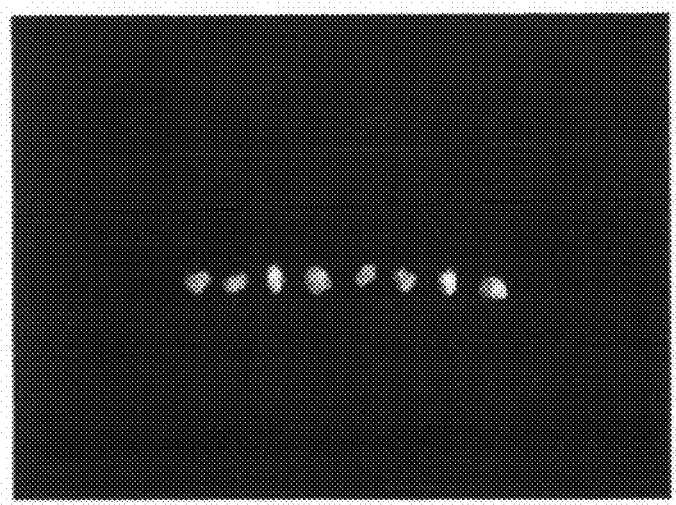
FIG. 2B is an illustrative photo of the eight deflected positions.

This principle has been applied to steering a light beam into multiple directions. Each mirror is placed at an angle with respect to its corresponding beam splitter face, so that the two polarizations exit at an angle with respect to each other (FIG. 1B). By cascading n similar stages, $2^n$ discrete angles may be obtained. The angles are permanently fixed by the geometry, and they are selected by digital electronics through the liquid crystal cells. One application is an all optical cross-bar.[3] Preliminary experimental results have demonstrated 8 discrete angles after 3 stages (FIG. 2), and an Air Force contract is underway to fabricate a 10 stage system with 1024 discrete angles.[4] The present invention is to construct a similar system in which light transverses n stages in the opposite direction, entering at one of $2^n$ discrete angles and emerging in a single direction. Furthermore, this light would not be a single laser beam, but would carry a complete image.

[3] See M. Feldman et al., Rev. Sci. Instruments 77, 066109 (2006).
[4] See M. Feldman and P. Bhattacharya, "A Digital Beam Steering System," Minority Leaders Winter Review, Panama City Beach, Fla., Mar. 6, 2007.

The practical limit to the arrangement shown in FIG. 1B is set by limitations in the performance of the beam splitters.

However, a telescope may be used to magnify the angular range up to about ±90°. In addition, 2 images at large angles to each other need not enter the same face of the first beam splitter; mirrors could direct images from any angles into adjacent faces of the beam splitter.

Figure 3A:
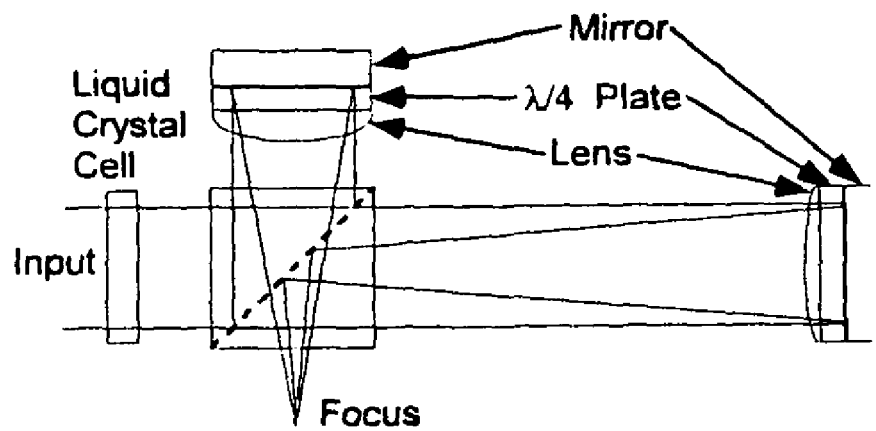
FIG. 3A shows two lenses for the common focus that is selected by the liquid crystal cell.
Figure 3B:
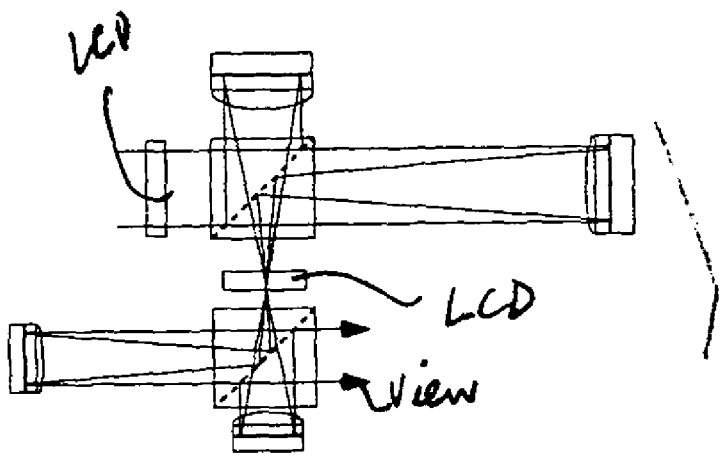
FIG. 3B illustrates two stage telescope with two liquid crystal cells and four selectable magnifications.
Figure 4:
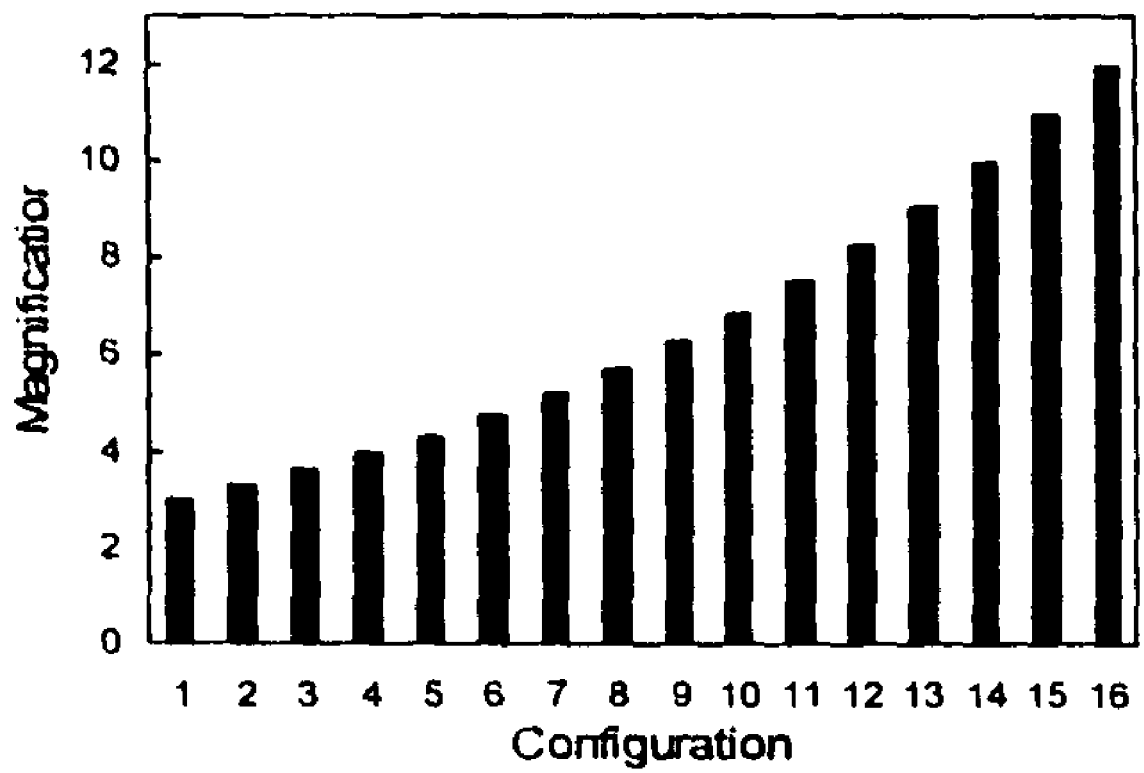
FIG. 4 illustrates 16 magnifications obtained with the lenses in Table 1, each magnification is 9.7% greater than the previous one.

The image pointing system described above may be combined with a digital zoom lens constructed on the same basic principle (FIGS. 3). Here, lenses have been placed in the two arms of the beam splitter (FIG. 3A). They have different focal lengths, but are positioned so that they have a common focal plane. They are combined with a similar system with two different focal length lenses (FIG. 3B). The combination is a telescope, in which the first liquid crystal cell selects the first lens and the second liquid crystal cell selects the second, i.e., there are four selectable magnifications. Cascading two similar arrangements results in 16 selectable discrete magnifications. Table I specifies the focal lengths of lenses that could be used to obtain 16 magnifications, equally spaced between 3 and 12, and FIG. 4 is a bar chart of the magnifications.

TABLE I

| Section | Focal Length | Focal Length |
|---------|--------------|--------------|
| Stage 1 | 1.32 | 2.76 |
| Stage 2 | 0.76 | 0.63 |
| Stage 3 | 1.32 | 1.90 |
| Stage 4 | 0.76 | 0.69 |

Figure 5A:
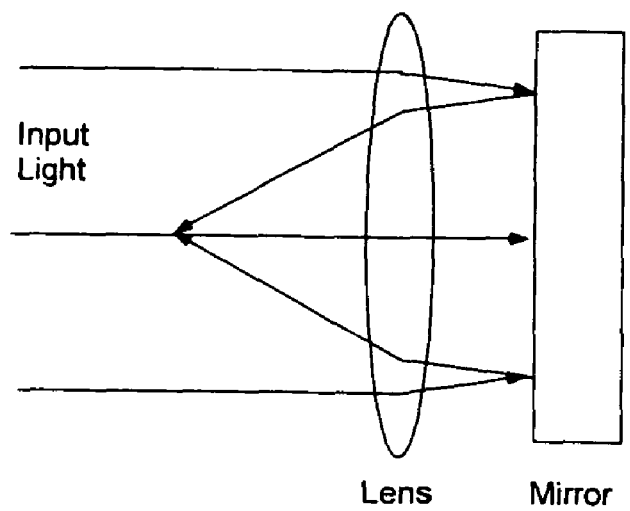
FIG. 5A illustrates a thick lens formed by separating a thin lens from a mirror.
Figure 5B:
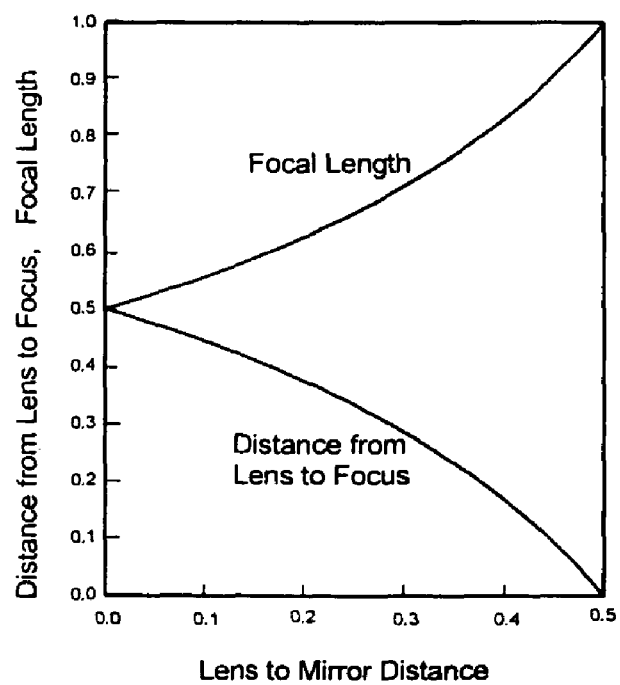
FIG. 5B illustrates focal length and distance from lens to the focus for a thin lens a focal length 1.0.

Additional design flexibility is obtained by separating the lenses from the mirrors (FIG. 5A). Light passes through each lens twice, with a separation between the passes, effectively forming a thick lens. The focal length of the combined thick lens, and the distance between the lens and the focal plane (the working distance), are functions of the distance between the lens and the mirror (FIG. 5B). This is a useful property, since it permits adjusting the focal lengths commercially available lenses to exactly match the requirements for equal increments of magnification.

The condition where twice the separation is approximately equal to the focal length of the lens is of special interest, since the return pass through the lens has little effect on the imaging, but redirects the light towards the next stage. Similarly, the first pass through the lens in the next stage has little effect on the imaging but also redirects the light. The combined effect is equivalent to a field lens, greatly enlarging the area that may be imaged. Of course, an additional field lens may be used to supplement this effect for operation at other separations.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. An optical system for the production of images, comprising:
   an all optical system;
   said all optical system manipulating images directly by digital electronics without loss in the number of resolvable spots at higher magnifications, wherein said manipulating images is done by directing polarized light in different paths.

* * * * *

UNITED STATES PATENT AND TRADEMARK OFFICE
CERTIFICATE OF CORRECTION

PATENT NO.        : 7,715,109 B2
APPLICATION NO.   : 12/154738
DATED             : May 11, 2010
INVENTOR(S)       : Martin Feldman It is certified that error appears in the above-identified patent and that said Letters Patent is hereby corrected as shown below:

Column 2, line 38, "Prentice Hass 1998" should read --Prentice Hall 1998--

Column 3, line 3, "...face of the first beam splitter;" should read --...face of the last beam splitter;--

Column 3, line 38, "...the focal lengths commercially available..." should read --...the focal lengths of commercially available...--

Signed and Sealed this

Twentieth Day of July, 2010

David J. Kappos
*Director of the United States Patent and Trademark Office*